April 1, 1958
D. E. NICHOLS
2,828,631
DETENT LIFTING DEVICE
Filed Nov. 3, 1954
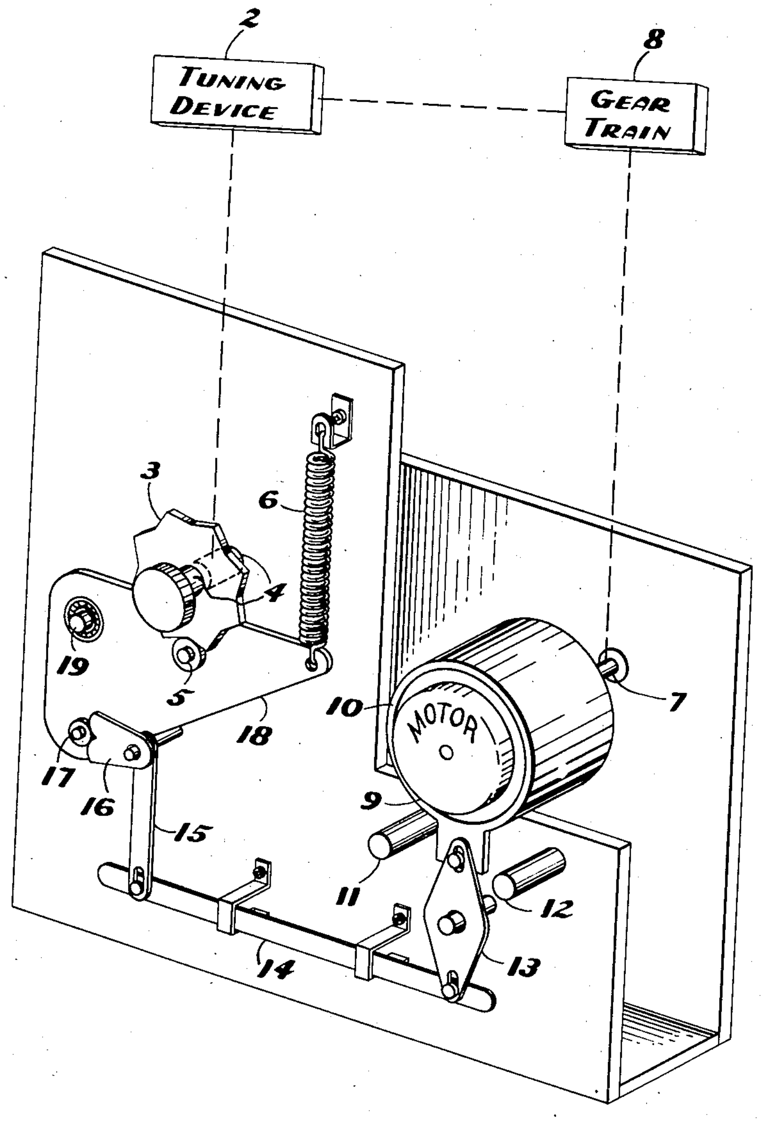
INVENTOR
DONALD E. NICHOLS
BY [signature]
ATTORNEY United States Patent Office 2,828,631 Patented Apr. 1, 1958

2,828,631

DETENT LIFTING DEVICE

Donald E. Nichols, Cedar Rapids, Iowa, assignor to Collins Radio Company, Cedar Rapids, Iowa, a corporation of Iowa Application November 3, 1954, Serial No. 466,633

6 Claims. (Cl. 74—10)

This invention relates to apparatus for allowing tuning mechanisms to be operated automatically or manually.

In radio equipment and associated equipment, it is often desirable to have tuning mechanisms which enable the user to rapidly tune the equipment to selected positions which correspond to selected frequencies. These selected positions having once been determined, the tuning mechanism and its associated elements are aligned at these selected positions to produce the desired frequencies. It is then necessary when using a rapid method of tuning the equipment that these positions be accurately reproduced or the equipment will not be operating at the selected frequency.

This accurate reproduction of a selected position of the tuning mechanism has been accomplished manually by using detent devices of various types.

The tuning of equipment to pre-selected positions is also performed by motor controls similar to the controls disclosed and claimed in Patent 2,444,840, issued to R. W. May on July 6, 1948. The motor control of the tuning mechanism as disclosed by Patent 2,444,840 is much more rapid and equally as accurate as manual control of the tuning mechanism. This invention provides for the combination of the manual and motor methods of tuning to pre-selected positions and further provides this combination wherein the accuracy and rapidity of each method is retained.

A feature of this invention is that it makes possible a combination of manual and motorized tuning. It is another feature that accurate rapid tuning to pre-selected positions is available instantaneously using either the manual or motor tuning. It is still another feature of this invention that this pre-selected tuning system is operable in either direction with either manual or motor tuning. It is a further feature that a choice of mode of control is available at any time.

This invention includes a rotatable shaft which is connected to a tuning device such as a condenser and this shaft may be rotated to a detented pre-selected position either by motor or manual rotation. This pre-selected position is determined by a detent mechanism when the shaft is manually rotated. This shaft is rotated to the pre-set position by a specified and controlled amount of motor rotation when the motor is operative. However, inasmuch as the detent mechanism is normally engaged, ready for manual tuning, it is necessary that the detent mechanism be disengaged from control of the shaft for operation of the motor rotation to pre-selected positions.

It is an object of this invention to provide a method of rapid tuning wherein the tuning to a pre-selected position or frequency may be accomplished either manually or by a motor. It is another object of this invention to provide rapid tuning in both directions with either method of tuning. It is still another object of this invention to provide a rapid tuning mechanism wherein the manual and motor tuning methods are combined in an economical manner. It is a further object of this invention to provide a system whereby either manual or motor tuning to a pre-selected position is available at any instant. It is still a further object of this invention to provide a system whereby if the motor is being used to tune the system to a pre-selected frequency, the manual method of tuning is instantaneously and automatically disconnected.

These and other objects of this invention will become more apparent when the following description is read in conjunction with the accompanying drawing, in which the figure is a perspective representation of this invention.

In the drawing the detented device 2 is normally a tuning device such as a rotary condenser. Thus, tuning of the detented device is accomplished by the rotation of the shaft 4 which is affixed to the condenser or tuning means which is not shown. Affixed to the shaft 4 is a detent wheel 3. This detent wheel has any number of detents which are so arranged that the detents or notches in the detent wheel 3 are engaged by the detent roller 5 so as to provide a number of fixed positions of the shaft 4. At each of these positions, a selected frequency is established in the detented or tuning device. The wheel 3 is manually rotatable and thus any of the pre-selected positions may be tuned by the controlled rotation of the wheel 3. The roller 5 is mounted on the detent arm 18 and is held against the wheel 3 by the spring 6. Thus, it is apparent that the manual rotation of wheel 3 requires a certain amount of force to overcome the force exerted by the spring. The force of the spring on arm 18 is necessary to accurately maintain the selected positions on wheel 3 and insure tuning of the detented device to the proper frequency.

Now if automatic tuning is desired, the tuning device affixed to shaft 4 is tuned by the operation of motor 9. The rotation of shaft 4 and the resultant tuning of the detented device is accomplished by motor 9 acting through gear train 8. The motor 9 is pivotally mounted on centers coincident with its output shaft 7. Motor 9 is a reversible motor equipped with a casing or housing 10 which is free to rotate about the shaft axis of the motor to a degree limited by the stops 11 and 12. Thus no output on shaft 7 of motor 9 is possible until such time as the housing has rotated a sufficient amount to force the lever arm 13 which is affixed to the housing against either stop 11 or stop 12. At such time as the lever arm 13 hits stop 11 or stop 12, an output on shaft 7 of motor 9 occurs and this output drives gear train 8. The operation of gear train 8 rotates shaft 4 and the tuning mechanism affixed thereto.

For the accurate rotation of shaft 4 to a prescribed position when controlled by motor 9, there should be no friction such that between the detent wheel 3 and the detent roller 5 when engaged. Therefore, when the motor 9 is used to control the rotation of shaft 4, the detent or manual method of tuning must somehow be disconnected.

This disconnection or disengagement of the detent wheel from the detent roller before the rotation of shaft 4 by motor 9 is provided in the following manner:

When the motor is operated, lever arm 13 is rotated with the housing 10 so as to hit either stop 11 or stop 12. A lateral movement is then given to link 14 affixed to the other end of lever arm 13 by this rotation of the end of lever arm 13. This lateral movement of link 14 is transmitted through the connection of link 14 to lever arm 15. The lateral movement of one end of lever arm 15 causes a rotary motion to be imparted to the detent lifting cam 16 connected to the other end of lever arm 15.

Regardless of the direction of rotation of motor 9 and the consequent direction of rotation of lever arm 13, link 14 moves laterally in the proper direction. When link 14 moves laterally, the lever arm 15 rotates the detent lifting cam 16 about its center and exerts a force against the control roller 17 of the detent arm 18. The force exerted by the detent lifting cam against the control roller causes the rotation of the detent arm 18 about its center 19. This rotation about the center 19 by detent arm 18 elongates the spring 6, and removes the detent roller 5 from the notch in detent wheel 3. Thus, shaft 4 is permitted to rotate freely under the control of the motor 9.

This control over the detent mechanism permits the operation of the tuning mechanism to be controlled either manually or by motor 9. It also provides for the disengagement of the manual control prior to the operation of motor 9 to rotate shaft 4. A choice of tuning methods is thus possible with either method being instantaneously available.

Although this invention has been described with respect to a particular embodiment thereof, it is not to be so limited as changes and modifications may be made therein which are within the full intended scope of the invention as defined by the appended claims.

What is claimed is:

1. A control system for a rotatable shaft comprising a rotatable shaft having a detent wheel affixed thereto, said detent wheel being manually rotatable in either direction, a detent roller normally positioned in one of the notches of said detent wheel, means for rotating said rotatable shaft including a gear train and a motor, and means for disengaging said detent roller from said detent wheel when the shaft is being rotated by said motor and said gear train.

2. A system for selectively controlling the rotation of a shaft comprising a shaft having a detent wheel affixed thereto, a detent roller normally positioned in one of the notches of said detent wheel, a gear train connected to said shaft, a motor, said motor connected to one end of said gear train for rotating said shaft, a housing on said motor, and a means responsive to the rotation of said housing and said motor for disengaging the detent roller from said detent wheel.

3. A system for selectively controlling the rotation of a shaft comprising a shaft having a detent wheel affixed thereto, said detent wheel having notches therein, a detent roller normally positioned in one of said notches of said detent wheel for arresting the rotational movement of said wheel, a gear train having one end connected to said shaft, a pivotally mounted motor, said motor connected to the other end of said gear train, a housing on said motor, said housing rotating with said motor, a lever arm attached to said housing and rotatable therewith, means for stopping the rotation of said housing and said lever arm, and means responsive to the rotation of said housing and said lever arm to disengage said detent roller from the notches of said detent wheel.

4. A system for selectively controlling the rotation of a shaft comprising a shaft having a detent wheel affixed thereto, said detent wheel having notches therein, a detent roller normally positioned in one of said notches of said detent wheel for arresting the rotational movement of said wheel, a gear train having one end connected to said shaft, a pivotally mounted motor, said motor connected to the other end of said gear train, a housing on said motor, said housing rotatable with said motor, a first lever arm attached to said housing and rotatable therewith, means for stopping the rotation of said housing and said lever arm, a link connected to said lever arm for translating the rotary motion of said lever arm to linear motion, a second lever arm affixed to the other end of said link for translating the linear motion of said link to rotary motion, and means responsive to the rotary motion of said second lever arm for disengaging the detent roller from said detent wheel.

5. A system for selectively controlling the rotation of a shaft comprising a shaft having a detent wheel affixed thereto, means for manually rotating said shaft, said detent wheel having notches therein, a detent roller affixed to a detent arm and normally positioned in one of said notches of said detent wheel for arresting the rotational movement of said wheel, a gear train, one end of said gear train being connected to said shaft, a pivotally mounted motor having a rotatable shaft, said shaft of said motor being connected to the other end of said gear train, a housing on said motor, said housing rotatable with said motor, a first lever arm attached at one end to said housing and rotatable therewith, means for stopping the rotation of said housing and said lever arm, a link connected to the other end of said lever arm for translating the rotary motion of said lever arm to linear motion, a second lever arm having one end affixed to the other end of said link for translating the linear motion of said link to rotary motion, and a cam affixed to the other end of said second lever arm for rotating said detent arm, thereby removing said detent roller from its position in a notch of said detent wheel.

6. A system for selectively controlling the rotation of a shaft comprising a shaft having a detent wheel affixed thereto, said detent wheel having notches therein, a detent arm having a detent roller affixed thereto, means for retaining said detent roller in one of the notches of said detent wheel, a pivotally mounted motor having a housing affixed thereto, said motor being connected to said shaft by a gear train, means for limiting the rotation of said housing, means responsive to the rotation of said housing for disengaging said detent roller from the notches of said detent wheel.

References Cited in the file of this patent

UNITED STATES PATENTS

| | | |
|---|---|---|
| 738,100 | Cuntz | Sept. 1, 1903 |
| 1,696,702 | Watlington | Dec. 15, 1928 |
| 2,342,851 | Fichter et al. | Feb. 29, 1944 |
| 2,366,573 | Swallow | Jan. 2, 1945 |
| 2,444,840 | May | July 6, 1948 |
| 2,494,008 | Schwarz et al. | Jan. 10, 1950 |
| 2,511,580 | Goodrich | June 13, 1950 |
| 2,521,968 | De Tar et al. | Sept. 12, 1950 |
| 2,529,660 | Meyer et al. | Nov. 14, 1950 |
| 2,706,787 | Sperber | Apr. 19, 1955 |

FOREIGN PATENTS

| | | |
|---|---|---|
| 792,380 | France | Oct. 21, 1935 |